(12) United States Patent
Ferreira et al.

(10) Patent No.: US 12,493,857 B1
(45) Date of Patent: Dec. 9, 2025

(54) COLLABORATION MODULE FOR MODEL-BASED SYSTEMS ENGINEERING PLATFORM

(71) Applicant: The United States of America, as represented by the Secretary of the Navy, Arlington, VA (US)

(72) Inventors: Jason Christopher Ferreira, Summerville, SC (US); Breighann Lynne Kalb, Charleston, SC (US); Ashlyn Noel Kersey Hanrahan, Charleston, SC (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/897,274

(22) Filed: Sep. 26, 2024

(51) Int. Cl.
  *G06Q 30/02* (2023.01)
  *G06F 16/27* (2019.01)
  *G06Q 10/10* (2023.01)

(52) U.S. Cl.
  CPC ........... *G06Q 10/103* (2013.01); *G06F 16/27* (2019.01)

(58) Field of Classification Search
  CPC .............................. G06Q 10/103; G06F 16/27
  See application file for complete search history.

(56) References Cited

U.S. PATENT DOCUMENTS

| 9,916,400 B1 * | 3/2018 | Winn | G06F 9/4488 |
| 2007/0180425 A1 * | 8/2007 | Storms | G06F 30/13 |
| | | | 717/104 |
| 2009/0172042 A1 * | 7/2009 | Bracha | G06Q 10/06 |
| 2014/0236550 A1 * | 8/2014 | Nysetvold | G06F 30/00 |
| | | | 703/2 |
| 2016/0098494 A1 * | 4/2016 | Webster | G06F 30/00 |
| | | | 703/1 |
| 2024/0078349 A1 * | 3/2024 | Schuchard | G06F 30/00 |

OTHER PUBLICATIONS

"How are elements internally coded in BIM?" (Ramos. Alberto; published on Jul. 19, 2024 at https://www.modelical.com/en/how-are-elements-inter-coded-in-bim-bim/) (Year: 2024).*

* cited by examiner

Primary Examiner — James M Detweiler
(74) Attorney, Agent, or Firm — Naval Information Warfare Center, Pacific; Kyle Eppele; Andrew J. Cameron

(57) ABSTRACT

A computer-implemented method is performed by a collaboration module of a model-based systems engineering platform. The method includes maintaining a working version of a project and importing a first element from a remote database that stores a collaborative version of the project. Importing the first element includes comparing a database identifier (DBID) of the first element to elements included in the working version of the project. If the DBID matches the DBID of an existing element in the working version, then one or more data fields of the existing element are updated. If no DBID match is found, then the working version is searched for an element having a universally unique identifier (UUID) that matches a UUID of the first element. If, however, the first element does not include a UUID, then the first element is added to the working version of the project as a new element.

16 Claims, 10 Drawing Sheets

COLLABORATION MODULE FOR MODEL-BASED SYSTEMS ENGINEERING PLATFORM

FEDERALLY-SPONSORED RESEARCH AND DEVELOPMENT

The United States Government has ownership rights in one or more inventions provided in this disclosure. Licensing inquiries may be directed to Office of Research and Technical Applications, Naval Information Warfare Center Atlantic, Code 70F00, North Charleston, SC, 29419-9022; voice (843) 218-3495; email ssc_lant_T2@navy.mil. Reference Navy Case No. 211538.

TECHNICAL FIELD

Aspects of the present disclosure relate generally to model-based systems engineering platforms, and in particular but not exclusively, relate to systems, methods, and software that facilitate collaboration between a model-based systems engineering platform and other modeling platforms.

BACKGROUND OF THE INVENTION

Systems engineering is an interdisciplinary field of engineering that includes designing, analyzing, integrating, and managing complex systems. The systems engineering specialty may include facilitating communication with and between other engineering disciplines to identify gaps, risks, and opportunities in a system's design. For example, mechanical, electrical, and software engineering may each have significant depth of knowledge in their respective fields but less knowledge about the bigger picture of the overall system. Systems engineers may have the greatest breadth, or span of knowledge, about the overall system but rely on domain subject matter experts for technical expertise on particular aspects of the system. Thus, communication with other engineering disciplines is an essential aspect of systems engineering.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
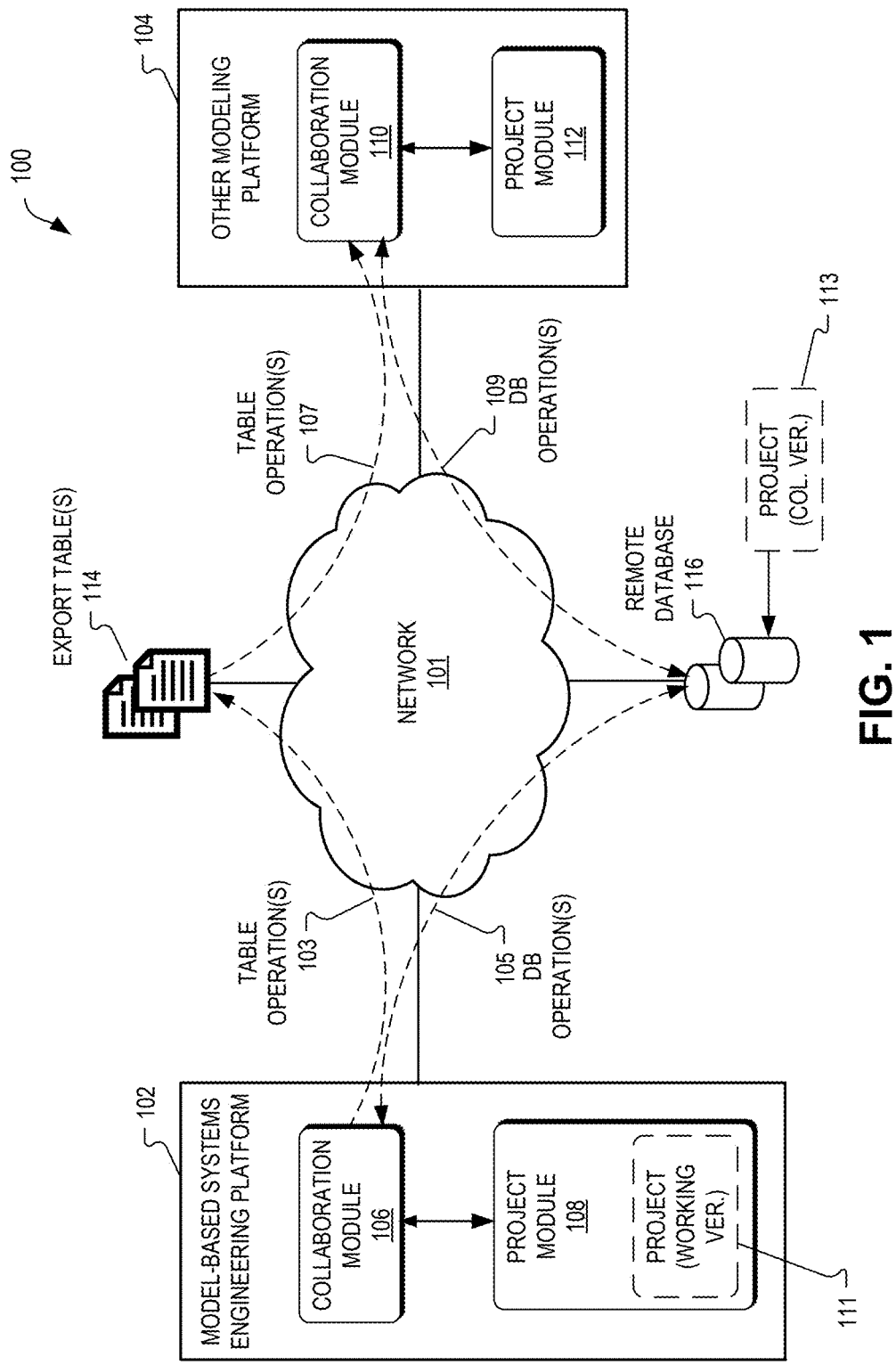
FIG. 1 illustrates an example network architecture for operation of a collaboration module of a model-based systems engineering (MBSE) platform, in accordance with aspects of the disclosure.

Embodiments of a method, a model-based systems engineering (MBSE) platform, and computer-readable media for collaborating with one or more other modeling platforms are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned above, communication with other engineering domains is an important aspect of systems engineering. One approach to systems engineering is a document-based approach, where all of the data about a particular system is written in documents (e.g., requirement documents, schematic documents, etc.). These documents are then shared with other engineering domains. An alternative to the document-based approach is a model-based approach, where all of the data for the system under design is stored within one or more computer models. In some aspects, a model is a digital representation of a real-world process or structure. The model may include several elements, or components, that collectively form the model. For example, an HVAC model may be included as part of a building system, where the model elements include digital representations of a blower, a furnace, ducting, or a register, etc.

In some cases, a systems engineer may utilize a model-based systems engineering (MBSE) platform (e.g., a computing device executing specialized software) to design, analyze, and/or verify a project system including its constituent digital models. The MBSE platform may implement a standardized modeling language, such as Systems Modeling Language (SysML) to define and represent the digital models of the system. In addition, the MBSE platform may be used to verify and/or view a model's interaction with other models included in the same system.

There are several advantages to a model-based approach over a document-based approach, which include enhanced clarity and visualization, consistency, synchronization, ease of updates, and automation. In addition, a purported advantage of the model-based approach is the supposed ease of collaboration between engineering domains (e.g., between the systems engineer and the domain-specific engineering domains and/or between the specific engineering domains themselves). However, some modeling platforms used by the domain-specific engineers may be incompatible, or at least unable to communicate with the MBSE platform that is used by the systems engineer. Thus, communication between the systems engineer and the other engineering domains may be relegated to emails, phone calls, meetings, etc. in order to convey information about changes and/or updates to a particular model. Such communication is slow, burdensome, and is susceptible to miscommunication due to different terminology, data, and/or concepts that are used by the various engineering domains.

Accordingly, aspects of the present disclosure provide a collaboration module of an MBSE platform that enables for digitally communicating information/data with one or more other modeling platforms. For example, in one aspect, a collaborative version of a project is stored at a remote database that is accessible by both the MBSE platform and one or more other modeling platforms. The collaboration module of the MBSE platform may enable the importing of data from the remote database to the MBSE platform and/or enable the exporting of data to the remote database for use by the other modeling platforms. In some aspects, the collaboration module may utilize both a database identifier (DBID) and a universally unique identifier (UUID) to track the initial and subsequent exporting and importing of elements to/from the remote database, as well as to identify new model elements added by both the MBSE platform and by the other modeling platforms. These and other aspects of the present disclosure will be described in more detail below.

FIG. 1 illustrates an example network architecture 100 for the operation of a collaboration module 106 of a model-based systems engineering (MBSE) platform 102, in accordance with aspects of the disclosure. Network architecture 100 is shown as including a network 101, MBSE platform 102, another modeling platform 104, one or more remotely-stored export tables 114, and a remote database 116. MBSE platform 102 is shown as including collaboration module 106 and a project module 108. The other modeling platform 104 is shown as including a collaboration module 110 and a project module 112. Also shown in FIG. 1, is a table operation 103, a database (DB) operation 105, a table operation 107, and a DB operation 109. In addition, FIG. 1 further illustrates a working version 111 of a project and a collaborative version 113 of the project.

In the illustrated example of FIG. 1, MBSE platform 102 is a computing device that includes software for model-based systems engineering. For example, MBSE platform 102 may include a project module 108 that enables one or more systems engineering functions. In some examples, the project module 108 comprises CAMEO™ modeling software by No Magic®, Incorporated. The project module 108 may include routines, program instructions, objects, and/or data structures that perform particular MBSE tasks or implements particular MBSE abstract data types, as described herein for the design, analysis, and or verification of complex systems. Such systems may be stored in a working version 111 of a project that includes one or more digital models that span over several narrower distinct engineering domains.

Figure 2:
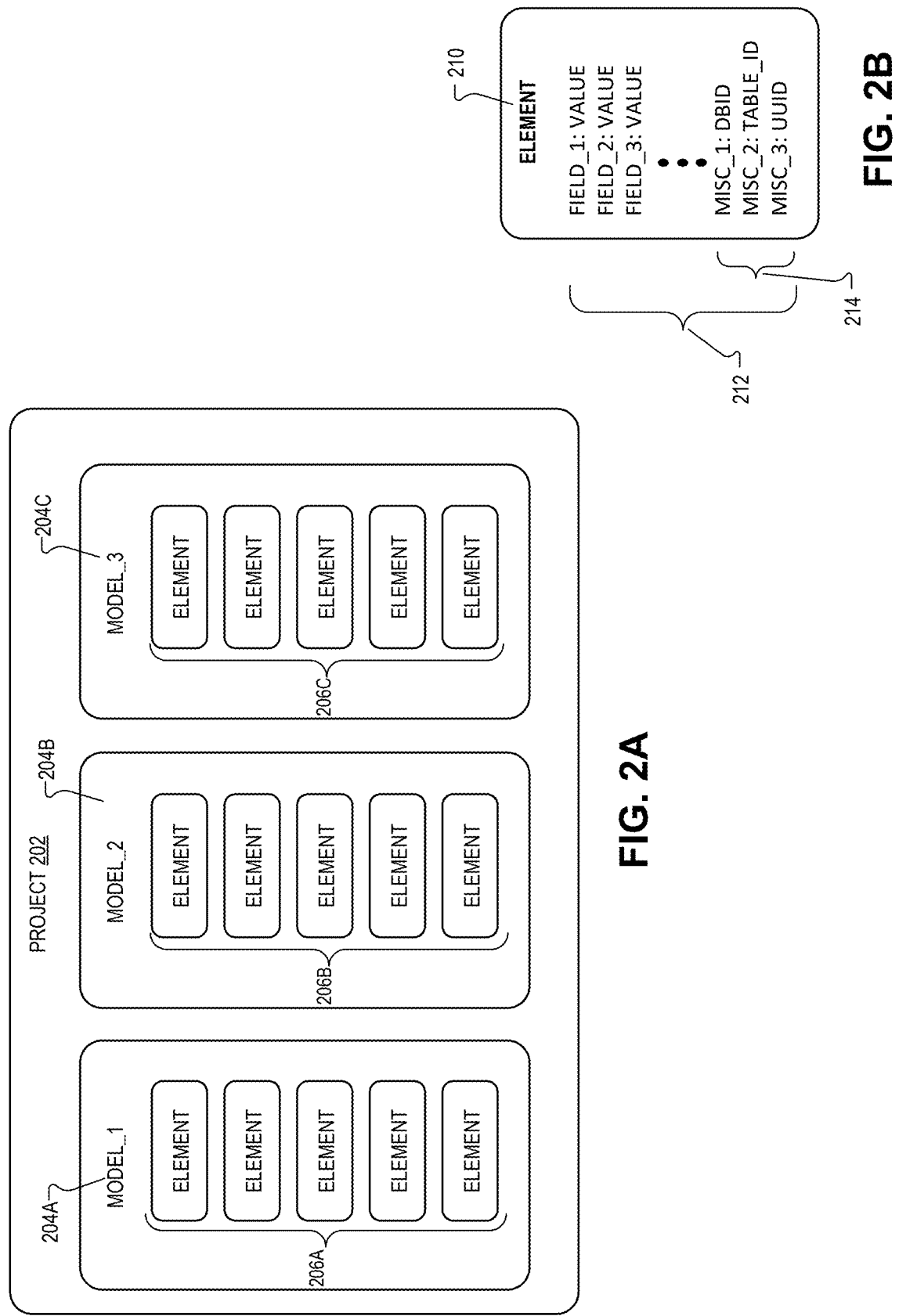
FIG. 2A illustrates an example project of a system under design for use by an MBSE platform, in accordance with aspects of the disclosure.
FIG. 2B illustrates an example element of a model that may be included in a project, in accordance with aspects of the disclosure.

For instance, FIG. 2A illustrates an example project 202 of a system under design for use by an MBSE platform, in accordance with aspects of the disclosure. Project 202 is one possible implementation of the working version 111 of the project of FIG. 1. As shown in FIG. 2A, project 202 includes several digital models 204A-204C. Although FIG. 2A illustrates project 202 as including three (3) models, any number of models may be provided in project 202, including one or more. In some aspects, each model 204A-204C is a digital representation of a real-world process or structure of the overall system of project 202. For example, the system represented by project 202 may be an office building, where model 204A is a model of an electrical plan for the building, model 204B is a model of an HVAC plan for the building, and model 204C is a model of an IT/computer resources plan for the building.

As shown in FIG. 2A, each model 204A-204C includes a respective plurality of model elements (e.g., 206A, 206B, and 206C). Each model element is a particular aspect or component of their respective model. For example, when taken together, the elements 206A collectively form model 204A, elements 206B collectively form model 204B, and elements 206C collectively form model 204C. By way of example, the elements 206A may include an electrical switch element, an electrical outlet element, a wiring element, a light fixture element, an electrical panel element, a fuse element, etc. that collectively form a model 204A of an electrical plan for a building.

FIG. 2B illustrates an example element 210 that may be included in a model, in accordance with aspects of the disclosure. Element 210 is one possible implementation of any of the elements 206A-206C shown in FIG. 2A. As shown in FIG. 2B, element 210 includes a plurality of data fields 212. Data fields 212 may be descriptors and/or parameters of the corresponding element 210 that are used for modeling the element together with other elements to form a model. For example, data fields 212 may include data fields for a type, a name, a model number, a part number, or a manufacturer of the element 210. In addition, the data fields 212 may include a data field specifying the location, orientation, and or connections of the particular instance of element 210. In some examples, each element 210 further includes a plurality of miscellaneous fields 214. Miscellaneous fields 214 may be initially blank and/or included as part of a data structure for element 210 that are designated as "reserved for future use". As will be described in more detail below, aspects of the present disclosure may include inserting (or adding) one or more identifiers into the miscellaneous fields 214 to track the importing and/or exporting of elements 210 (e.g., importing and exporting between the working version 111 of the project and a collaborative version 113 of the project).

Figure 3:
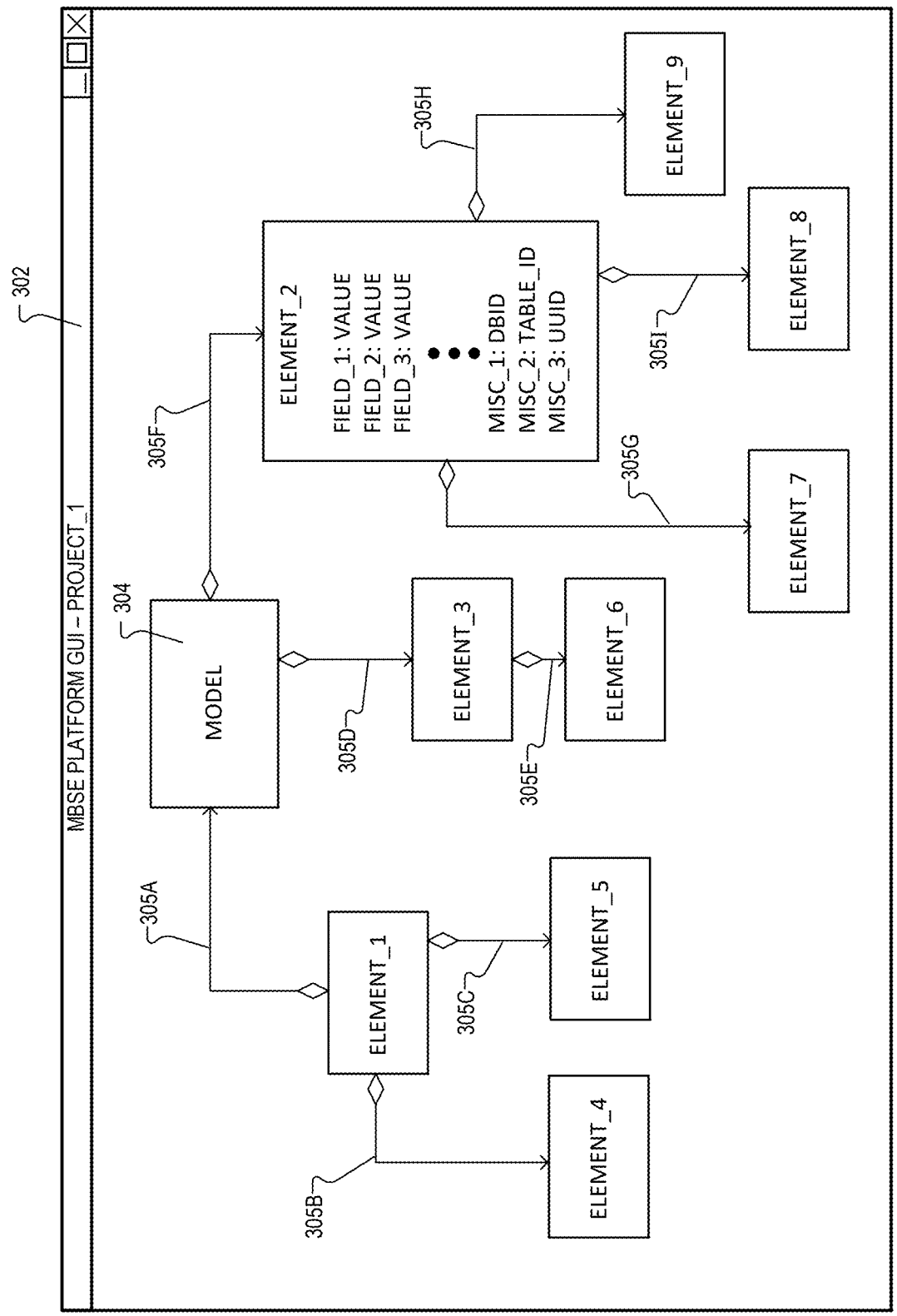
FIG. 3 illustrates an example graphical user interface of an MBSE platform, in accordance with aspects of the disclosure.

FIG. 3 illustrates an example graphical user interface (GUI) 302 of an MBSE platform, in accordance with aspects of the disclosure. GUI 302 is one possible user interface generated by the MBSE platform 102 of FIG. 1. In some implementations, MBSE platform 102 is not configured to generate, render, or display a real-world visualization (e.g., a 3-dimensional rendering) of a system or its constituent models. Instead, MBSE platform 102 may be configured to generate one or more other views or diagrams that illustrate various aspects of the system that improve or assist a system engineer's understanding of an overall system. For example, MBSE platform 102 may be configured to generate and display a behavior diagram of a system under design. Examples of a behavior diagram may include an activity diagram, a sequence diagram, a state machine diagram, and/or a use case diagram. MBSE platform 102 may also be configured to generate and display a requirement diagram and/or certain blocks diagrams. For instance, FIG. 3 illustrates GUI 302 displaying a structural block diagram of a model 304 that may be included in a system under design by MBSE platform 102. The structural block diagram of GUI 302 includes displaying the model 304 and its constituent elements (e.g., ELEMENT_1 through ELEMENT_9) as simple blocks. In addition, GUI 302 may illustrate the relationships 305A-305I between the elements. In some examples, the relationships 305A-305I are graphical representations of the physical connections and/or operational interactions between the various elements of model 304. Having GUI 302 display model 304 as a block diagram of elements and their corresponding relationships 305A-305I may allow a systems engineer to quickly and easily design, view, and edit a model and its constituent elements. In one example, GUI 302 may enable a user to select an element (e.g., ELEMENT_2) and then view/edit one or more of that element's data fields.

Returning now to FIG. 1, network architecture 100 illustrates another modeling platform 104. In some instances, the other modeling platform 104 is a computing device that includes model-based software for a particular engineering domain. For example, the project module 112 of other modeling platform 104 may include routines, program instructions, objects, and/or data structures that perform particular model-based engineering tasks or implements particular model-based abstract data types. In some aspects, other modeling platform 104 is a building information modeling (BIM) platform that is specifically for the design, editing, rendering, and visualization of two-dimensional and/or three-dimensional models of a building or other physical structure. For example, the project module 112 may include REVIT™ modeling software by Autodesk®, Incorporated.

Figure 4:
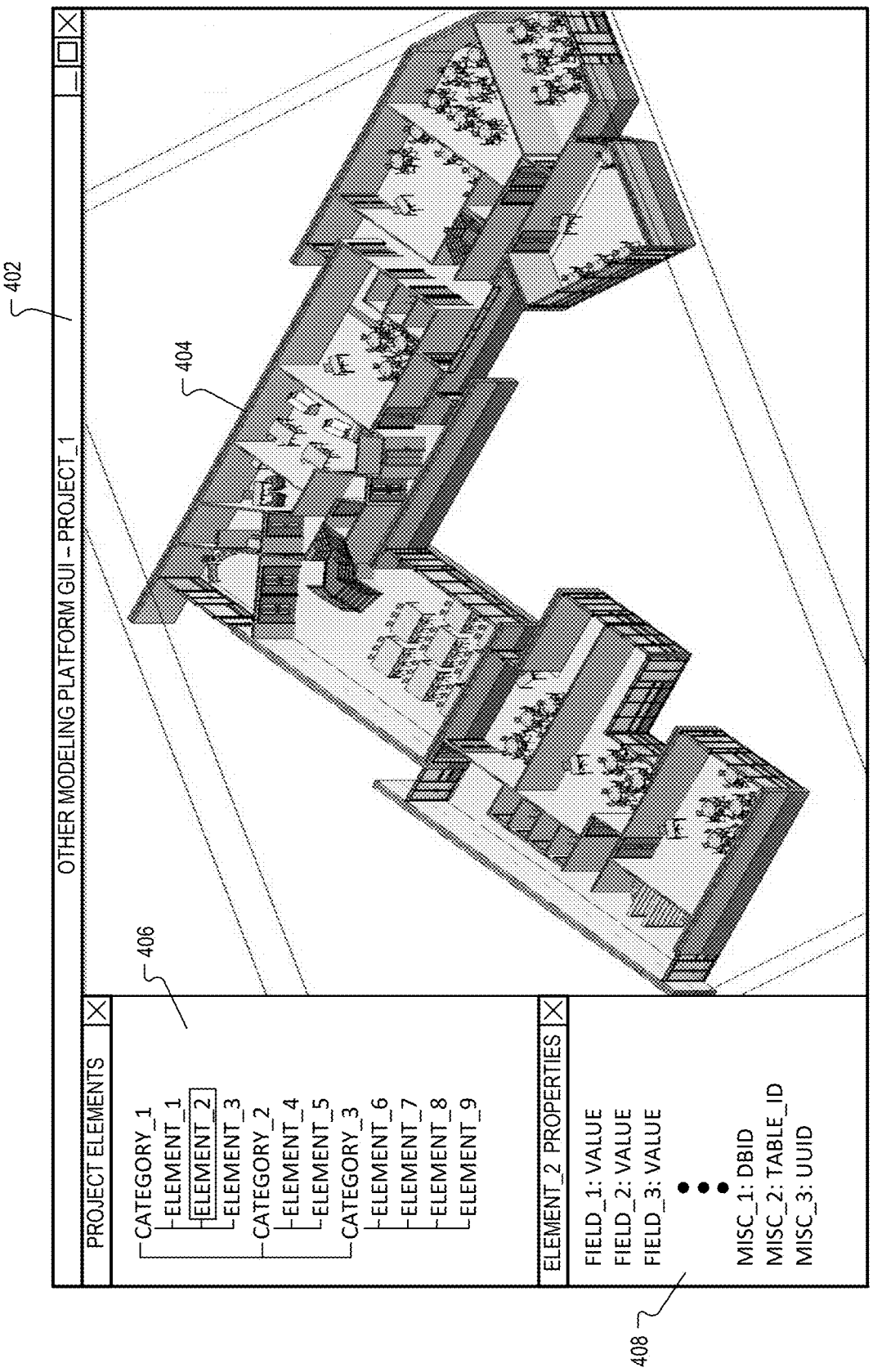
FIG. 4 illustrates an example graphical user interface of a modeling platform, in accordance with aspects of the disclosure.

FIG. 4 illustrates an example graphical user interface (GUI) 402 of a modeling platform, in accordance with aspects of the disclosure. GUI 402 is one possible implementation of a user interface generated by the other modeling platform 104 of FIG. 1. As shown in FIG. 4, GUI 402 may display a three-dimensional rendering of a model 404 that may be included in a system under design by modeling platform 104. GUI 402 also includes displaying the model's constituent elements (e.g., ELEMENT_1 through ELEMENT_9) as a list 406. GUI 402 may be configured to enable one or more domain-specific engineering functions to be performed on the model 404 of a project. These functions may include changing (e.g., adding, deleting, and/or modifying) model elements of model 404. For example, GUI 402 may enable a user to select an element (e.g., ELEMENT_2) and then view/edit one or more of that element's data fields via user interface window 408.

In some aspects, the model 404 shown in GUI 402 is the same model as model 304 shown in GUI 302 of FIG. 3, but represented/visualized in a different form. Similarly, the elements of model 404 of FIG. 4 (i.e., ELEMENT_1 to ELEMENT_9) may be the same elements of model 304 of FIG. 3. Thus, in some instances, changes made to the model elements of the model 304 on the MBSE platform 102 may need to be shared with the other modeling platform 104. Similarly, changes made to the model elements of model 404 on the other modeling platform 104 may need to be shared with the MBSE platform 102.

Accordingly, referring again to FIG. 1, network architecture 100 includes a collaborative version 113 of a project that is stored at a remote database 116. In some aspects, the collaborative version 113 of the project includes one or more elements that are used by both the MBSE platform 102 and the other modeling platform 104 for working on their respective copies of the same model. For example, the working version 111 of the project may include a plurality of elements (e.g., ELEMENT_1 to ELEMENT_9 as shown in model 304 of FIG. 3), where copies of one or more of these elements are also stored in the collaborative version 113 of the project stored on the remote database 116. In some examples, the project module 112 of the other modeling platform 104 may include its own locally-stored version of the project (not explicitly shown in FIG. 1) that also includes copies of one or more of the same elements.

As shown in FIG. 1, the MBSE platform 102 includes a collaboration module 106 that enables MBSE platform 102 to access and interact with the remote database 116 over network 101. In addition, the other modeling platform 104 may include a collaboration module 110 that enables modeling platform 104 to access and interact with the remote database 116, also over network 101.

In some aspects, network 101 includes a number of routing agents and processing agents. The network 101 may be a local or global system of interconnected computers and computer networks that uses a common communication protocol over digital interconnections. For example, network 101 may utilize an Internet protocol suite (e.g., the Transmission Control Protocol (TCP) and IP) for communication among disparate devices and networks.

In FIG. 1, the MBSE platform 102 and the other modeling platform 104 are connected to the network 101 directly (e.g., over an Ethernet connection or Wi-Fi or 802.11-based network) or via another intermediate network (e.g., the Internet). The MBSE platform 102 and the other modeling platform 104 may each have a wired or wireless connection to the network 101, such as a direct connection to a modem or router (e.g., a Wi-Fi router with both wired and wireless connectivity). In some examples, MBSE platform 102 and the other modeling platform 104 are each a desktop computer, a laptop computer, a tablet computer, a PDA, a smart phone, or the like. In other examples, MBSE platform 102 and/or other modeling platform 104 may be connected to network 101 via an optical communication system, a cable modem, a digital subscriber line (DSL) modem, or the like. The MBSE platform 102 and other modeling platform 104 may be configured to communicate over a physical communications interface or layer with one or more other devices on network 101 using one or more standard Internet protocols (e.g., TCP/IP).

The collaboration module 106 of MBSE platform 102 and the collaboration module 110 of the other modeling platform 104 each include routines, program instructions, objects, and/or data structures that perform particular tasks or implement particular abstract data types, as described herein. For example, the collaboration module 106 may be configured to maintain elements included in the working version 111 of the project. In some aspects, maintaining the working version 111 of the project includes the collaboration module 106 generating and assigning a new universally unique identifier (UUID) for each element included in the working version 111 of the project. In some aspects, a UUID is a digital label or other identifier that is unique among all other elements included in the working version 111 of the project, as well as among all other elements included elsewhere, including in the other modeling platforms 104, in export tables 114, in remote database 116, and anywhere else on network 101. In some examples, the UUID is a 128-bit label that may be represented as 32 hexadecimal digits. For instance, a UUID may be in the format "xxxxxxxx-xxxx-xxxx-xxxx-xxxxxxxxxxxx", with or without the hyphen ("-"). As discussed above, the UUID may be inserted/added to a miscellaneous field of a corresponding element (e.g., see miscellaneous fields 214 included in element 210 of FIG. 2B). In some examples, the collaboration module 106 may generate a new UUID by utilizing/invoking a UUID class of the JAVA® programming language.

In addition to maintaining the working version 111 of the project, the collaboration module 106 may also be configured to import elements from the remote database 116. In some aspects, importing an element includes the collaboration module 106 retrieving an element from the remote database 116 and then determining whether the retrieved element corresponds to one of three categories of imported elements: (1) the retrieved element corresponds to an element already included and previously imported to the working version 111 of the project; (2) the retrieved element corresponds to an element already included in the working version 111 of the project but has not been previously imported from the remote database 116; or (3) the retrieved element does not correspond to any elements included in the working version 111 of the project and is a new element added to the project by the other modeling platform 104. The particular process followed by the collaboration module 106 for importing the retrieved element may, in part, depend on the determined category of the retrieved element.

In yet another aspect, the collaboration module 106 may be configured to export elements from the working version 111 of the project. In some aspects, exporting an element includes the collaboration module 106 retrieving an element from the working version 111 of the project then determining whether the retrieved element corresponds to one of three categories of exported elements: (1) the retrieved element corresponds to an element previously-imported from the remote database 116 and also currently appears in the remote database 116; (2) the retrieved element corresponds to an element for which an export was previously initiated, but does not yet appear in the remote database 116; or (3) the retrieved element corresponds to a new element added to the working version 111 of the project and has not previously been exported. The particular process followed by the collaboration module 106 for exporting the retrieved element may depend, in part, on the determined category of the retrieved element. As will be described in more detail below, when importing and exporting, the collaboration module 106 may make the determination of which category the retrieved element corresponds based on an inspection of the retrieved element's miscellaneous fields (e.g., see miscellaneous fields 214 of FIG. 2B) which may include a UUID and/or a database identifier (DBID).

As discussed above, the MBSE platform 102 may generate and assign UUIDs for each element included in the working version 111 of the project. Similarly, elements stored in the collaborative version 113 may each include a respective database identifier (DBID). Each respective DBID may be a unique identifier from among the DBIDs of other elements included in the collaborative version 113. In some examples, the other modeling platform 104 is configured to generate and assign a DBID for each element it adds to the collaborative version 113 stored in the remote database 116. In some examples, the DBID may be inserted/added to a miscellaneous field of a corresponding element (e.g., see miscellaneous fields 214 included in element 210 of FIG. 2B). One possible format for the DBID is a four (4) byte integer value that ranges from 0 to $(2^{31})-1$ (or 2,147,483,647).

In some implementations, the other modeling platform 104 may have dominion over the remote database 116. That is, the database (DB) operations 105 that the MBSE platform 102 may perform on the remote database 116 may be limited. For example, the DB operations 105 performed by the collaboration module 106 may allow the MBSE platform 102 to query the remote database 116, retrieve existing elements, and modify existing elements, but may not allow the MBSE platform 102 to add a new element directly to the remote database 116. That is, the MBSE platform 102 may be prevented, or disabled, from adding new elements directly to the remote database 116. Instead, the addition of new elements to the remote database 116 may only, in some instances, be performed by the other modeling platform 104. Thus, as shown in FIG. 1, the example network architecture 100 includes one or more remotely-stored export tables 114. In some aspects, remotely-stored export tables 114 includes at least one queue of elements of the project that are to be added to the collaborative version 113 stored in the remote database 116. Thus, in some examples, the collaboration module 106 of the MBSE platform 102 may export a newly added element by performing a table operation 103 to add the new element to the export tables 114. The collaboration module 110 of the other modeling platform 104 may then perform a table operation 107 to read/retrieve the new element from the export table 114, where the collaboration module 110 then subsequently performs a DB operation 109 to add the new element to the collaborative version 113 of the project at the remote database 116.

Figure 5:
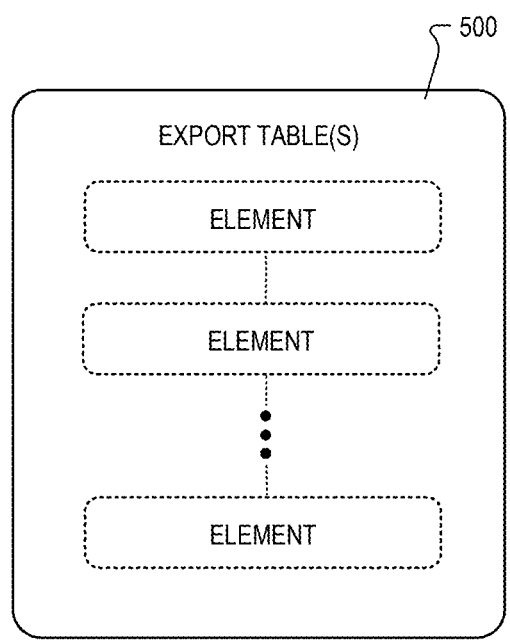
FIG. 5 illustrates an example of a remotely-stored export table, in accordance with aspects of the disclosure.

FIG. 5 illustrates an example of a remotely-stored export table 500, in accordance with aspects of the disclosure. Export table 500 is one possible implementation of export table 114 of FIG. 1. In some implementations export table 500 is a two-dimensional array of entries that allow for a correspondence between model elements and their data fields. However, any suitable data structure may be implemented for remotely-storing a queue of elements for exporting, such as a linked list, a record, a hash table, or a stack, etc. In some examples, the export table 500 is stored in the remote database 116, but is logically separated from the collaborative version 113 of the project with the same restrictions on adding new elements, as discussed above.

Referring back to FIG. 1, in some implementations, remote database 116 is a relations dataset management system, such as a MICROSOFT® SQL server. Thus, in some examples, the table operation 103, DB operation 105, table operation 107, and DB operation 109 may be network messages formatted in a structured query language (SQL) syntax.

Figure 6:
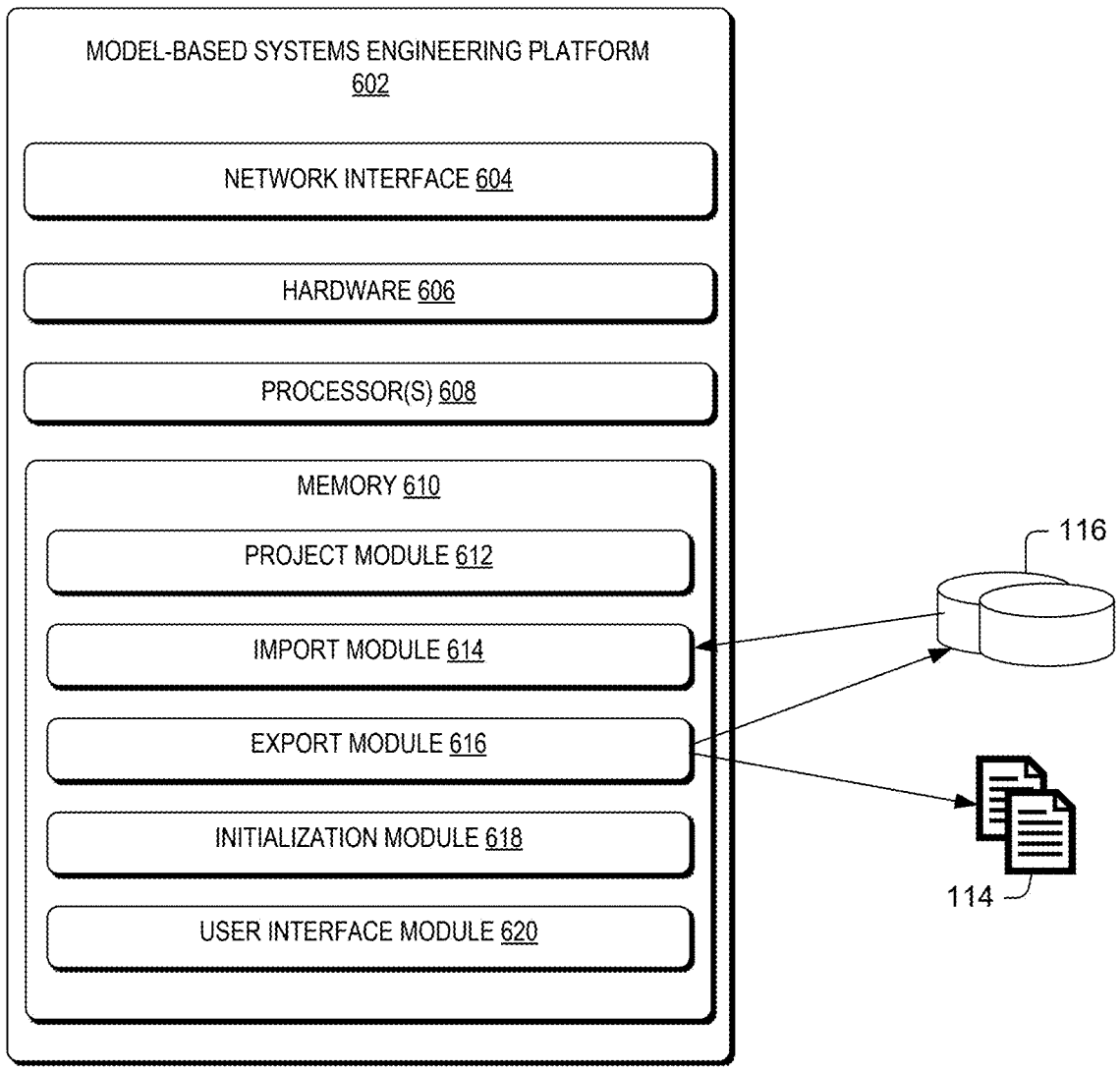
FIG. 6 illustrates an example MBSE platform, in accordance with aspects of the disclosure.

FIG. 6 illustrates an example MBSE platform 602, in accordance with aspects of the disclosure. MBSE platform 602 is one possible implementation of MBSE platform 102 of FIG. 1. MBSE platform 602 is shown as including a network interface 604, hardware 606, a processor 608, and a memory 610. Also shown in FIG. 6 is remote database 116 and remotely-stored export tables 114.

The network interface 604 may include wireless and/or wired communication components that enable the MBSE platform 602 to transmit data to and receive data from other networked devices. This communication may involve, for example, sending and receiving messages, parameters, or other types of information on network 101 of FIG. 1. The hardware 606 may include additional hardware interfaces, data communication, or data storage hardware. For example, the hardware interfaces may include a data output device (e.g., electronic display, audio speakers), and one or more data input devices (e.g., keypads, keyboards, mouse devices, touch screens, microphones, etc.).

The processor 608 of MBSE platform 602 may execute instructions and perform tasks under the direction of software components that are stored in memory 610. For example, the memory 610 may store various software components that are executable or accessible by the one or more processors 608 of the MBSE platform 602. The various components may include a project module 612, an import module 614, an export module 616, an initialization module 618, and a user interface module 620. The project module 612 and the user interface module 620, collectively, may be one possible implementation of project module 108 of FIG. 1. Similarly, the import module 614, export module 616, and initialization module 618, collectively, may be one possible implementation of the collaboration module 106 of FIG. 1.

The project module 612, import module 614, export module 616, initialization module 618, and user interface module 620 may include routines, program instructions, objects, and/or data structures that perform particular tasks or implement particular abstract data types. For example, the project module 612 may enable a user to perform particular MBSE tasks or implement particular MBSE abstract data types for the design, analysis, and or verification of a project system, such as represented in the working version 111 of the project of FIG. 1. In some implementations, the project module 612 may enable a user to change (e.g., add, delete, and/or modify) model elements of model included in the working version 111 of the project. In another example, the user interface module 620 may be configured to generate and display one or more user interfaces to a user, such as GUI 302 of FIG. 3. Further details regarding the operation of the other modules of the MBSE platform 602, including the import module 614, the export module 616, and the initialization module 618 will be described below with reference to the illustrated processes of FIGS. 7-10.

Figure 7:
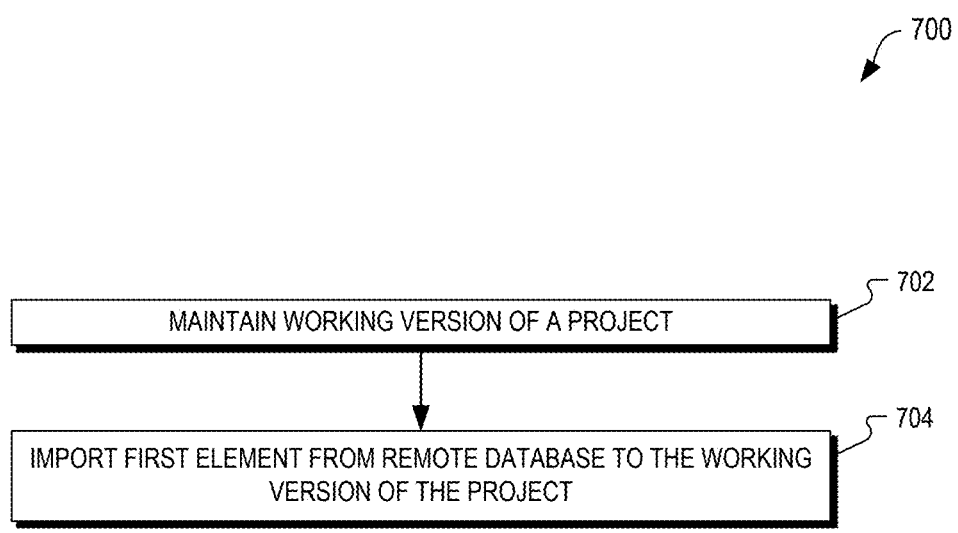
FIG. 7 is a flow diagram of an example process performed by an MBSE platform, in accordance with aspects of the disclosure.

FIG. 7 is a flow diagram of an example process 700 performed by an MBSE platform, in accordance with aspects of the disclosure. Process 700 is one example process performed by the MBSE platform 102 of FIG. 1 and/or the MBSE platform 602 of FIG. 6. As shown in FIG. 7, process block 702 includes the initialization module 618 maintaining a working version of the project (e.g., working version 111 as shown in FIG. 1). In some aspects, maintaining the working version 111 of the project includes the initialization module 618 generating and assigning a new universally unique identifier (UUID) for each element included in the working version 111 of the project. In another aspect, maintaining the working version 111 of the project may include the initialization module 618 receiving an indication that a new element has been added to the working version 111 of the project. In some aspects, the project module 612 may generate the indication of a new element in response to a user modifying the project to include a new element. In another aspect, the maintenance module 618 may receive the indication of a new element from the import module 614 in response to a new element being imported from the remote database 116 into the working version 111. After receiving such an indication, the initialization module 618 may generate a new UUID and then modify the new element to include the newly generated UUID. As mentioned, above, assigning or modifying an element to include a UUID may include inserting the UUID into a miscellaneous field of the element (e.g., miscellaneous field 214 of FIG. 2B).

Next, in a process block 704, the import module 614 imports a first element from the remote database 116 to the working version 111 of the project. In some aspects, the import module 614 initiates the importing of the first element in response to user input received at the MBSE platform 602. The user input may indicate: (a) that a particular one or more elements are to be imported from the remote database 116, (b) that the entire collaborative version 113 of the project is to be imported from the remote database 116, (c) that one or more elements corresponding to a particular model are to be imported from the remote database 116, or (d) that all elements of a particular type are to be imported from the remote database 116.

Figure 8:
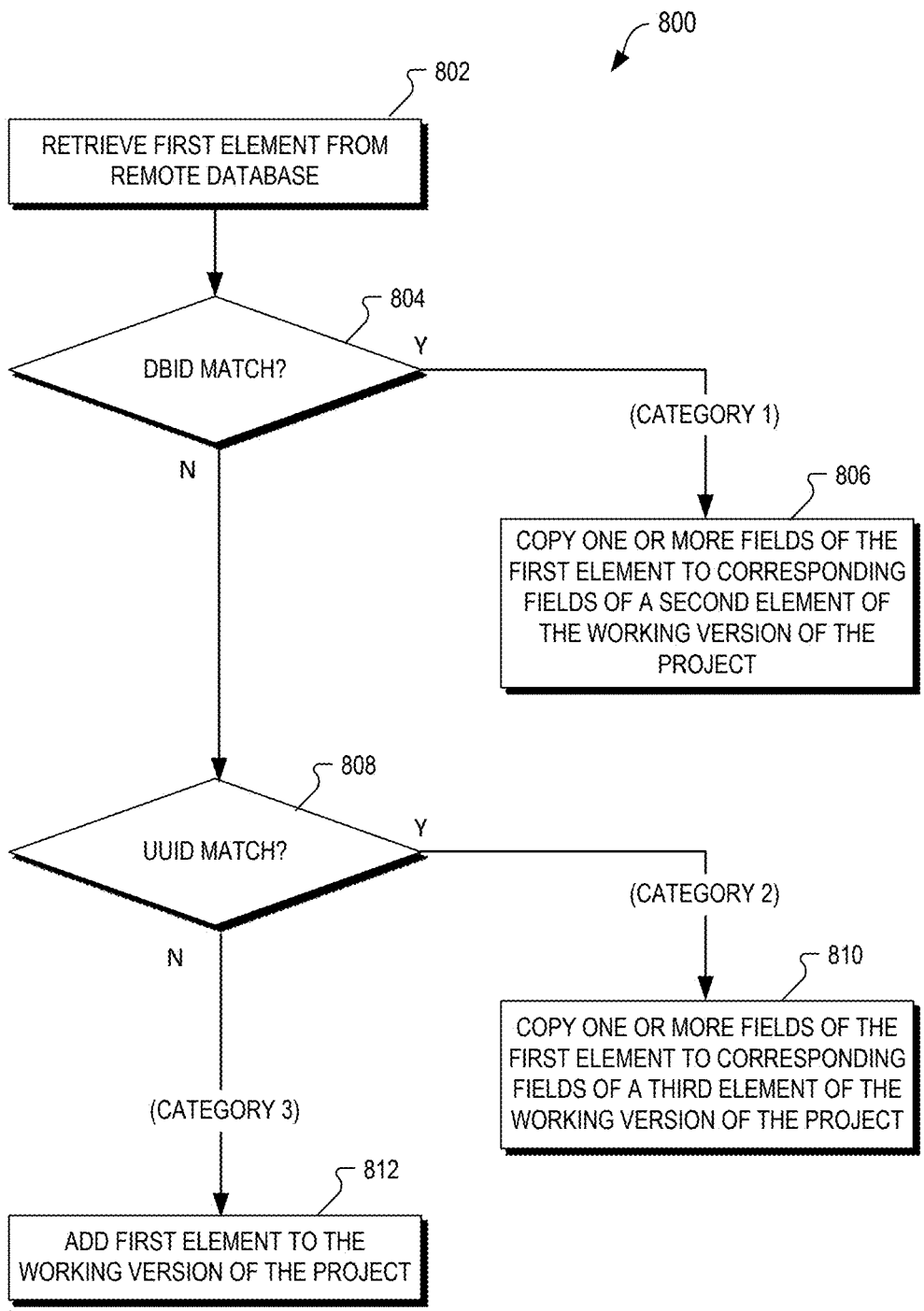
FIG. 8 is a flow diagram of an example process of importing an element from a remote database, in accordance with aspects of the disclosure.

FIG. 8 is a flow diagram of an example process 800 of importing an element from a remote database, in accordance with aspects of the disclosure. Process 800 is one possible implementation of process block 704 of FIG. 7. First, in a process block 802, the import module 614 retrieves a first element from the remote database 116. In some examples, retrieving the first element may include the import module 614 performing a DB operation 105 to read or query the remote database 116 for the first element.

In some aspects, the process followed by the MBSE platform 602 to import an element from the remote database 116 may, in part, depend on a determination of which of three categories the imported element belongs. For example, process 800 illustrates the three categories of an imported element as CATEGORY 1, CATEGORY 2, and CATEGORY 3. The determination of which category the imported element belongs may be determined based on one or more of the element's miscellaneous fields, which may include a UUID and/or a DBID. For example, in a decision block 804, the import module 614 examines the miscellaneous field of the first element to obtain the first element's DBID. The import module 614 then compares the DBID of the first element to the plurality of elements included in the working version 111 of the project. If the DBID of the first element does indeed match the DBID of a second element included in the working version 111, then the first element is a CATEGORY 1 retrieved element and process 800 proceeds to process block 806. In some aspects, a category 1 retrieved element means that first element is already included in the working version 111 of the project and has previously been imported. For example, since an element does not get assigned a DBID until it is added to the collaborative version 113 of the project, the fact that a second element is included in the working version 111 with an already-assigned DBID means that this element has been previously imported from the collaborative version 113. As shown in FIG. 8, process block 806 includes the import module 614 copying one or more data fields of the first element to a corresponding one or more data fields of the second element. For example, one or more of the data fields 212 (e.g., see FIG. 2B) from the element retrieved from the collaborative version 113 may be copied to the same one or more data fields 212 of the DBID-matching element included in the working version 111.

In some instances, the import module 614, when comparing DBIDs may determine that none of the plurality of elements included in the working version 111 of the project have a DBID that matches the DBID of the first element. If not, decision block 808 includes the import module 614 examining whether the first element includes a UUID. If the first element includes a UUID and the UUID matches a UUID of a third element included in the working version 111, then the first element is a CATEGORY 2 retrieved element and process 800 proceeds to process block 810. In some aspects, a category 2 retrieved element means that first element corresponds to an element already included in the working version 111 of the project but has not previously been imported. In other words, this is the first instance of importing the first element, but the first element has been previously exported by the MBSE platform 602. For example, since an element is assigned a UUID only by the MBSE platform 602, the fact that the first element includes an already-assigned UUID, but no matching DBID means that this element originated in the working version 111 but has not been previously imported from the collaborative version 113. As shown in FIG. 8, process block 810 includes the import module 614 copying one or more data fields of the first element to a corresponding one or more data fields of the third element. For example, one or more of the data fields 212 (e.g., see FIG. 2B) from the element retrieved from the collaborative version 113 may be copied to the same one or more data fields 212 of the UUID-matching element included in the working version 111. In some examples, process block 810 may further include the import module 614 modifying the third element to include a DBID that matches the DBID of the first element. For example, a miscellaneous field storing the DBID (e.g., see miscellaneous field 214 of FIG. 2B) from the element retrieved from the collaborative version 113 may be copied to the same miscellaneous field 214 of the UUID-matching element included in the working version 111.

If in decision block 808, the import module 614 finds that the first element does not include any UUID, then the first element is a CATEGORY 3 retrieved element and process 800 proceeds to process block 812. In some aspects, a category 3 retrieved element means that the first element does not correspond to any elements included in the working version 111 of the project and is a new element added to the project by the other modeling platform 104. As shown in FIG. 8, process block 812 includes the import module 614 adding the first element to the plurality of elements included in the working version 111 of the project. In addition, adding the first element to the working version 111 of the project may trigger the initialization module 618 to generate and add a UUID to the newly added element.

In some aspects, import module 614 may repeat process 800 for each of a plurality of elements that are to be imported from the collaborative version 113 of the remote database to the working version 111.

Figure 9:
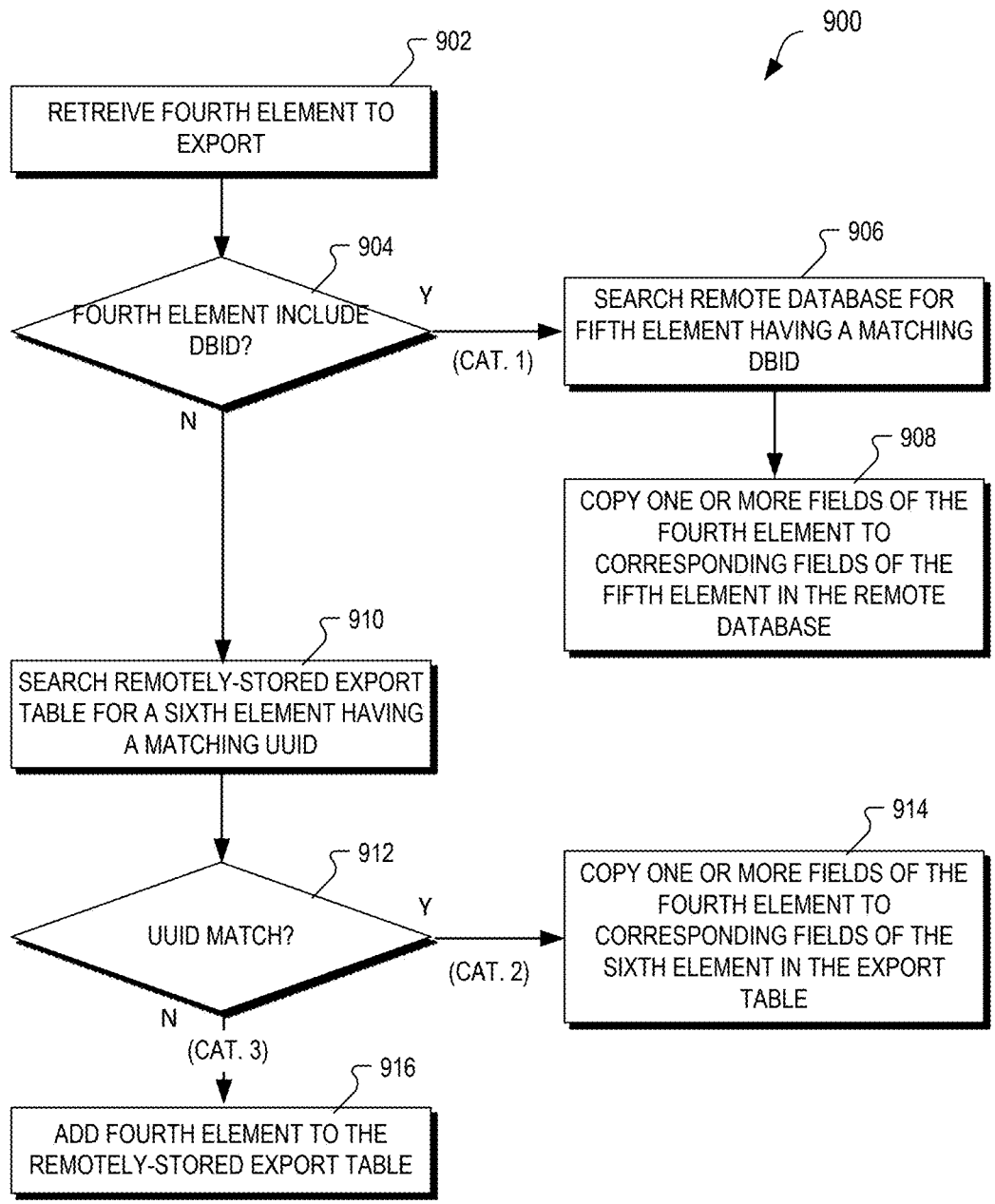
FIG. 9 is a flow diagram of an example process of exporting an element from a working version of a project, in accordance with aspects of the disclosure.

FIG. 9 is a flow diagram of an example process 900 of exporting an element from the working version 111 of a project, in accordance with aspects of the disclosure. Process 900 is one example process performed by the MBSE platform 102 of FIG. 1 and/or the MBSE platform 602 of FIG. 6. First, in a process block 902, the export module 616 retrieves a fourth element from the working version 111 of the project at the MBSE platform 602. In some aspects, the export module 616 initiates the exporting of the fourth element in response to user input received at the MBSE platform 602. The user input may indicate: (a) that a particular one or more elements are to be exported from the working version 111, (b) that the entire working version 111 of the project is to be exported to the remote database 116, (c) that one or more elements corresponding to a particular model are to be exported to the remote database 116, or (d) that all elements of a particular type are to be exported to the remote database 116.

In some aspects, the process followed by the MBSE platform 602 to export an element to the remote database 116 may, in part, depend on a determination of which of three categories the exported element belongs. For example, process 900 illustrates the three categories of an exported element as CATEGORY 1, CATEGORY 2, and CATEGORY 3. The determination of which category the exported element belongs may be determined based on one or more of the element's miscellaneous fields, which may include a UUID and/or a DBID. For example, in a decision block 904, the export module 616 examines the miscellaneous field of the fourth element to determine whether the fourth element contains a DBID. If fourth element does indeed include a DBID, then the fourth element is a CATEGORY 1 export element. In some aspects, a category 1 export element means that fourth element corresponds to an element that was previously imported from the remote database 116 and is still included in the remote database 116. Process 900 proceeds to process block 906, where the export module 616 performs a DB operation 105 to search the remote database 116 for a fifth element that includes a DBID that matches the DBID of the fourth element. Next, in process block 908, the export module 616 copies one or more data fields of the fourth element to a corresponding one or more data fields of the fifth element. For example, one or more of the data fields 212 (e.g., see FIG. 2B) from the element retrieved from the working version 111 may be copied to the same one or more data fields 212 of the DBID-matching element included in the collaborative version 113.

If in decision block 904, the export module 616 finds that the fourth element does not include any DBID, then process 900 proceeds to process block 910, wherein the export module 616 performs a table operation 103 to search the remotely-stored export table 114 based on a UUID of the fourth element. In a decision block 912, if a sixth element is found in the export table 114 that includes a UUID that matches the UUID of the fourth element, then the fourth element is a CATEGORY 2 export element.

As mentioned above, in some implementations, the MBSE platform 602 may be prevented or unable to add elements directly to the remote database 116. Thus, a remotely stored export table 114 may be provided that includes a queue of elements that are to be added to the remote database 116. The other modeling platform 104 may retrieve elements included in the remotely stored export table 114, and subsequently add them to the remote database 116. However, the operations of the MBSE platform 102 may be asynchronous with those of the other modeling platform 104. Thus, in some situations, the MBSE platform 102 may attempt to export an element, where a previous export of the same element has not yet been completed by the other platform 104. Accordingly, a category 2 export element may correspond to an element for which an export was previously initiated, but does not yet appear in the remote database 116, and still remains in the export table 114. In process block 914, the export module 616 copies one or more data fields of the fourth element to a corresponding one or more data fields of the sixth element. For example, one or more of the data fields 212 (e.g., see FIG. 2B) from the element retrieved from the working version 111 may be copied to the same one or more data fields 212 of the UUID-matching element included in the remotely stored export table 114.

If in decision block 912, the export module 616 finds that none of the elements included in the queue of the remotely stored export table 114 include a UUID that matches the UUID of the fourth element, then the fourth element is a CATEGORY 3 export element. In some aspects, a category 3 export element means that the fourth element corresponds to a new element that was added to the working version 111 of the project and has not previously been exported. Thus, process block 916 includes the export module 616 adding the fourth element to the remotely stored export table 114 (e.g., adding the fourth element to the queue as shown in FIG. 5).

Figure 10:
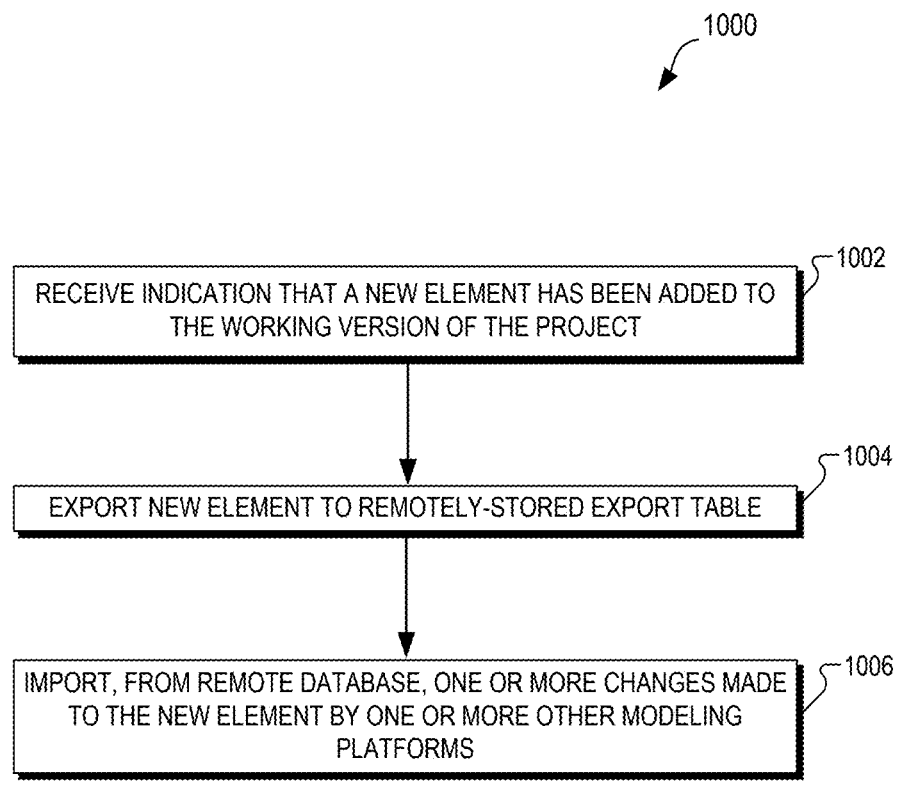
FIG. 10 is a flow diagram of an example process performed by an MBSE platform, in accordance with aspects of the disclosure.

FIG. 10 is a flow diagram of an example process 1000 performed by an MBSE platform, in accordance with aspects of the disclosure. Process 1000 is one example process performed by the MBSE platform 102 of FIG. 1 and/or the MBSE platform 602 of FIG. 6. As discussed herein, aspects of the present disclosure include facilitating collaboration between a systems engineer and other engineering disciplines by enabling the sharing of information/data between an MBSE platform 102 and one or more other modeling platforms 104. Such collaboration may be increased by allowing both the MBSE platform 102 and the other modeling platform 104 to operate on their own respective versions of the same project, while also allowing changes made to be digitally and seamlessly shared with one another. By way of example, process block 1002 of FIG. 1 illustrates MBSE platform 102 receiving an indication that a new element has been added to the working version 111 of a project. As mentioned above, the indication of a new element may be responsive to a user of the MBSE platform 102 modifying or otherwise editing the working version 111 of the project. The MBSE user may then initiate an export of the newly added element. As shown in process block 1004, the MBSE platform 102 initiates the export of the new element by adding the new element to the export table 114. The other modeling platform 104 may then subsequently retrieve the new element and add it to its own locally-stored version of the project. A user of the other modeling platform 104 may then may edit, modify, or otherwise make changes to the new element via the other modeling platform 104. The new element, including the changes made at the other modeling platform 104, is then added to the collaborative version 113 of the project stored at the remote database 116. The MBSE platform 102 may then import, the element, including the one or more changes made, to the local version 111 of the project.

The processes, methods, functions, or modules explained above may be implemented in hardware, software, firmware, or any combination thereof. If implemented in software, the techniques may be stored on or transmitted as one or more instructions or code on a computer-readable medium. The techniques described may constitute computer-executable instructions embodied or stored within a tangible or non-transitory computer-readable medium, that when executed by a processor will cause the processor to perform the operations or acts described. Additionally, the processes may be embodied within hardware, such as an application specific integrated circuit ("ASIC") or otherwise.

A tangible non-transitory computer-readable medium includes any mechanism that provides (i.e., stores) information in a form accessible by a machine (e.g., a computer, network device, personal digital assistant, manufacturing tool, any device with a set of one or more processors, etc.). For example, a machine-readable medium may include recordable or non-recordable media (e.g., read only memory (ROM), random access memory (RAM), magnetic disk storage media, optical storage media, flash memory devices, etc.).

In addition, the methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method, performed by a collaboration module of a model-based systems engineering platform, the method comprising:
    maintaining a working version of a project of the model-based systems engineering platform, wherein the working version of the project includes a plurality of elements, which collectively form at least one model of a system under design or analysis, wherein each element of the plurality of elements of the working version includes one or more miscellaneous data fields that contain a respective universally unique identifier (UUID); and
    importing a first element from a remote database to the working version of the project, wherein the first element is stored at the remote database in a collaborative version of the project, accessible by one or more other modeling platforms, wherein the collaborative version of the project includes a plurality of elements, including the first element, wherein each element of the plurality of elements of the collaborative version includes one or more miscellaneous data fields that contain a respective database identifier (DBID) that is a unique identifier of each element among other elements included in the collaborative version stored in the remote database, wherein the DBIDs are independent and distinct from the UUIDs, wherein importing the first element includes:
        retrieving the first element from the remote database;
        comparing a DBID of the first element to the plurality of elements included in the working version of the project;
        determining that none of the plurality of elements included in the working version of the project include a DBID in their one or more respective miscellaneous data fields that matches the DBID of the first element; and in response thereto:
            determining that the first element does not include a UUID;
            adding the first element, including one or more data fields of the first element, as a new element to the plurality of elements of the working version of the project;
            receiving an indication that the new element has been added to the working version of the project; and in response thereto:
                generating a new UUID for the new element; and
                modifying the new element to include the new UUID in one or more miscellaneous data fields of the new element.

2. The computer-implemented method of claim 1, wherein adding the first element as the new element includes copying the one or more data fields of the first element to a corresponding one or more data fields of the new element and modifying the new element to include a DBID that matches the DBID of the first element.

3. The computer-implemented method of claim 1, further comprising exporting a fourth element from the working version of the project to the remote database, wherein exporting the fourth element includes:
 in response to determining that the fourth element includes a DBID, searching the remote database base for a fifth element that includes a DBID that matches the DBID of the fourth element; and if so
 copying one or more data fields of the fourth element to a corresponding one or more data fields of the fifth element stored in the remote database.

4. The computer-implemented method of claim 3, further comprising:
 in response to determining that the fourth element does not include any DBID, searching a remotely-stored export table for a UUID of the fourth element, wherein the remotely-stored export table is accessible by the one or more other modeling platforms and includes a queue of one or more elements of the project that are to be added to the collaborative version of the project in the remote database by the one or more other modeling platforms.

5. The computer-implemented method of claim 4, further comprising:
 determining that a sixth element included in the remotely-stored export table includes a UUID that matches the UUID of the fourth element; and in response thereto
 copying the one or more data fields of the fourth element to a corresponding one or more data fields of the sixth element included in the remotely-stored export table.

6. The computer-implemented method of claim 4, further comprising:
 determining that none of the one or more elements included in the queue of the remotely-stored export table include a UUID that matches the UUID of the fourth element; and in response thereto
 adding the fourth element, including the one or more data fields, to the remotely-stored export table.

7. The computer-implemented method of claim 1, wherein the one or more other modeling platforms comprises a building information modeling platform.

8. The computer-implemented method of claim 1, further comprising:
 receiving an indication that a second new element has been added to the plurality of elements of the working version of the project;
 exporting the second new element to a remotely-stored export table that includes a queue of one or more elements of the project that are to be added to the collaborative version of the project in the remote database by the one or more other modeling platforms; and
 importing, from the remote database, one or more changes made to the second new element by the one or more other modeling platforms.

9. A model-based systems engineering platform, comprising:
 a network interface to be communicatively coupled to a network;
 at least one processor coupled to the network interface; and
 at least one memory coupled to the at least one processor, the at least one memory having instructions stored therein, which when executed by the at least one processor, cause the model-based systems engineering platform to:
  maintain a working version of a project of the model-based systems engineering platform, wherein the working version of the project includes a plurality of elements, which collectively form at least one model of a system under design or analysis, wherein each element of the plurality of elements of the working version includes one or more miscellaneous data fields that contain a respective universally unique identifier (UUID); and
  import a first element from a remote database to the working version of the project, wherein the first element is stored at the remote database in a collaborative version of the project, accessible by one or more other modeling platforms, wherein the collaborative version of the project includes a plurality of elements, including the first element, wherein each element of the plurality of elements of the collaborative version includes one or more miscellaneous data fields that contain a respective database identifier (DBID) that is a unique identifier of each element among other elements included in the collaborative version stored in the remote database, wherein the DBIDs are independent and distinct from the UUIDs, wherein the instructions to import the first element includes instructions to:
  retrieve the first element from the remote database via the network interface;
  compare a DBID of the first element to the plurality of elements included in the working version of the project;
  in response to determining that the DBID of the first element matches a DBID of a second element included in the plurality of elements of the working version of the project, copy one or more data fields of the first element to a corresponding one or more data fields of the second element; and
  in response to determining that none of the plurality of elements included in the working version of the project have a DBID that matches the DBID of the first element:
   copy the one or more data fields of the first element to a corresponding one or more data fields of a third element of the plurality of elements in response to determining that the first element includes a UUID that matches a UUID of the third element; and
   add the first element, including the one or more data fields, as a new element to the plurality of elements of the working version of the project in response to determining that the first element does not include a UUID;
   receive an indication that the new element has been added to the working version of the project; and in response thereto
    generate a new UUID for the new element; and
    modify the new element to include the new UUID in one or more miscellaneous data fields of the new element.

10. The model-based systems engineering platform of claim 9, wherein the instructions further cause the model-based systems engineering platform to:
 export a fourth element from the working version of the project to the remote database, wherein the instructions to export the fourth element includes instructions to:
  in response to determining that the fourth element includes a DBID, search the remote database base for a fifth element that includes a DBID that matches the DBID of the fourth element; and if so copy one or more data fields of the fourth element to a corresponding one or more data fields of the fifth element stored in the remote database.

11. The model-based systems engineering platform of claim 10, wherein the instructions further cause the model-based systems engineering platform to:
in response to determining that the fourth element does not include any DBID, search a remotely-stored export table for a UUID of the fourth element, wherein the remotely-stored export table is accessible by the one or more other modeling platforms and includes a queue of one or more elements of the project that are to be added to the collaborative version of the project in the remote database by the one or more other modeling platforms.

12. The model-based systems engineering platform of claim 10, wherein the instructions further cause the model-based systems engineering platform to:
determine that a sixth element included in the remotely-stored export table includes a UUID that matches the UUID of the fourth element; and in response thereto
copy the one or more data fields of the fourth element to a corresponding one or more data fields of the sixth element included in the remotely-stored export table.

13. The model-based systems engineering platform of claim 10, wherein the instructions further cause the model-based systems engineering platform to:
determine that none of the one or more elements included in the queue of the remotely-stored export table include a UUID that matches the UUID of the fourth element; and in response thereto
add the fourth element, including the one or more data fields, to the remotely-stored export table.

14. The model-based systems engineering platform of claim 9, wherein the instructions further cause the model-based systems engineering platform to:
receive an indication that a second new element has been added to the plurality of elements of the working version of the project;
export the second new element to a remotely-stored export table that includes a queue of one or more elements of the project that are to be added to the collaborative version of the project in the remote database by the one or more other modeling platforms; and
import, from the remote database, one or more changes made to the second new element by the one or more other modeling platforms.

15. One or more non-transitory computer-readable media storing computer-executable instructions that upon execution cause one or more processors to perform acts comprising:
maintain a working version of a project of a model-based systems engineering platform, wherein the working version of the project includes a plurality of elements, which collectively form at least one model of a system under design or analysis, wherein each element of the plurality of elements of the working version includes one or more miscellaneous data fields that contain a respective universally unique identifier (UUID); and
import a first element from a remote database to the working version of the project, wherein the first element is stored at the remote database in a collaborative version of the project, accessible by one or more other modeling platforms, wherein the collaborative version of the project includes a plurality of elements, including the first element, wherein each element of the plurality of elements of the collaborative version includes one or more miscellaneous data fields that contain a respective database identifier (DBID) that is a unique identifier of each element among other elements included in the collaborative version stored in the remote database, wherein the DBIDs are independent and distinct from the UUIDs, wherein the instructions that upon execution cause the one or more processors to import the first element further include instructions that upon execution cause the one or more processors to:
retrieve the first element from the remote database;
compare the DBID of the first element to the plurality of elements included in the working version of the project;
in response to determining that the DBID of the first element matches a DBID of a second element included in the plurality of elements of the working version of the project, copy one or more data fields of the first element to a corresponding one or more data fields of the second element; and
in response to determining that none of the plurality of elements included in the working version of the project have a DBID that matches the DBID of the first element:
copy the one or more data fields of the first element to a corresponding one or more fields of a third element of the plurality of elements in response to determining that the first element includes a UUID that matches a UUID of the third element; and
add the first element, including the one or more data fields, as a new element to the plurality of elements of the working version of the project in response to determining that the first element does not include a UUID;
receive an indication that the new element has been added to the working version of the project; and in response thereto
generate a new UUID for the new element; and
modify the new element to include the new UUID in one or more miscellaneous data fields of the new element.

16. The one or more non-transitory computer-readable media of claim 15, wherein the instructions further cause the one or more processors to:
export the new element to a remotely-stored export table that includes a queue of one or more elements of the project that are to be added to the collaborative version of the project in the remote database by the one or more other modeling platforms; and
import, from the remote database, one or more changes made to the new element by the one or more other modeling platforms.

* * * * *